United States Patent [19]

Clancey

[11] Patent Number: 4,962,838
[45] Date of Patent: Oct. 16, 1990

[54] VISCOUS DAMPER WITH LOW SEAL DRAG TORQUE

[75] Inventor: Stephen M. Clancey, Battle Creek, Mich.

[73] Assignee: Eaton Corporation, Cleveland, Ohio

[21] Appl. No.: 414,860

[22] Filed: Sep. 29, 1989

[51] Int. Cl.⁵ ............................................. F16D 3/14
[52] U.S. Cl. ................................. 192/106.1; 464/24; 464/64; 192/58 B
[58] Field of Search ................ 192/58 B, 106.1, 106.2; 464/24, 64

[56] References Cited

U.S. PATENT DOCUMENTS

| | | | |
|---|---|---|---|
| 2,316,820 | 4/1943 | Thelander | 192/68 |
| 2,513,379 | 7/1950 | Thelander | 192/68 |
| 4,601,676 | 7/1986 | Tojima et al. | 464/24 |
| 4,608,883 | 9/1986 | Bopp | 74/574 |
| 4,739,866 | 4/1988 | Reik | 192/70.17 |
| 4,782,932 | 11/1988 | Janson | 192/70.17 |
| 4,790,792 | 12/1988 | Bopp | 464/66 |

*Primary Examiner*—Rodney H. Bonck
*Assistant Examiner*—Nicholas Whitelaw
*Attorney, Agent, or Firm*—P. S. Rulon

[57] ABSTRACT

A clutch plate assembly (24) for a vehicle driveline includes a spring damping mechanism (28) disposed in parallel with a viscous shear damper mechanism (30) for damping spring recoil. The spring damping mechanism includes a set of pairs of relatively high rate helical compression sprigs (34,36) for transmitting torque and attenuating torsionals when a transmission input shaft (22) is connected to a load and a set of relatively low rate helical compression springs (38) connected in series with the high rate springs (34,36) for attenuating torsionals when the shaft (22) is not connected to a load. The viscous damper mechanism includes an annular housing (48) having first and second radially extending sidewalls (52,54) defining a compartment (48a) having a clutch assembly (50) disposed therein for viscous clutching coaction via a viscous shear oil. An inner member (56) of the clutch assembly (50) includes a dynamic seal assembly (66 or 72) molded integral therewith for sealing the inner extent of the compartment (48a). The housing sidewalls (52,54), and the clutch and seal assemblies are formed to facilitate a method for readily assembling and accurately filling the damper with viscous shear oil. Three spacer ring embodiments (51, 80 to 90) are disclosed for controlling or establishing axial spacing between sidewall seal surfaces (52b, 54) which cooperate the dynamic seal assembly (66 or 72).

8 Claims, 4 Drawing Sheets

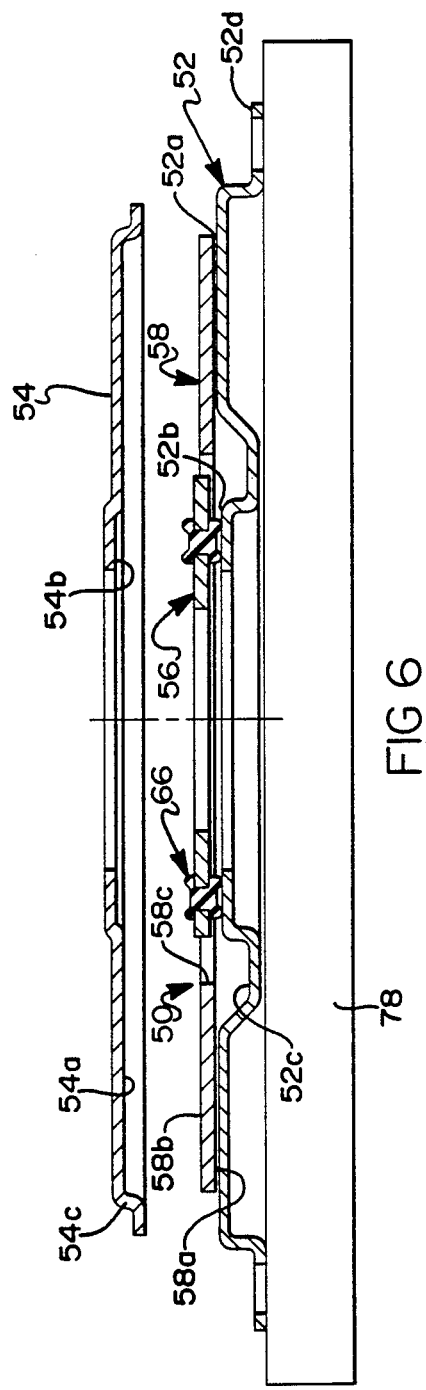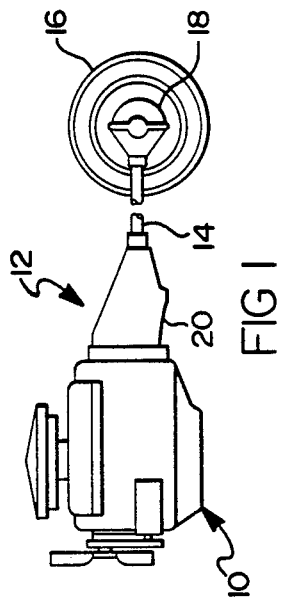

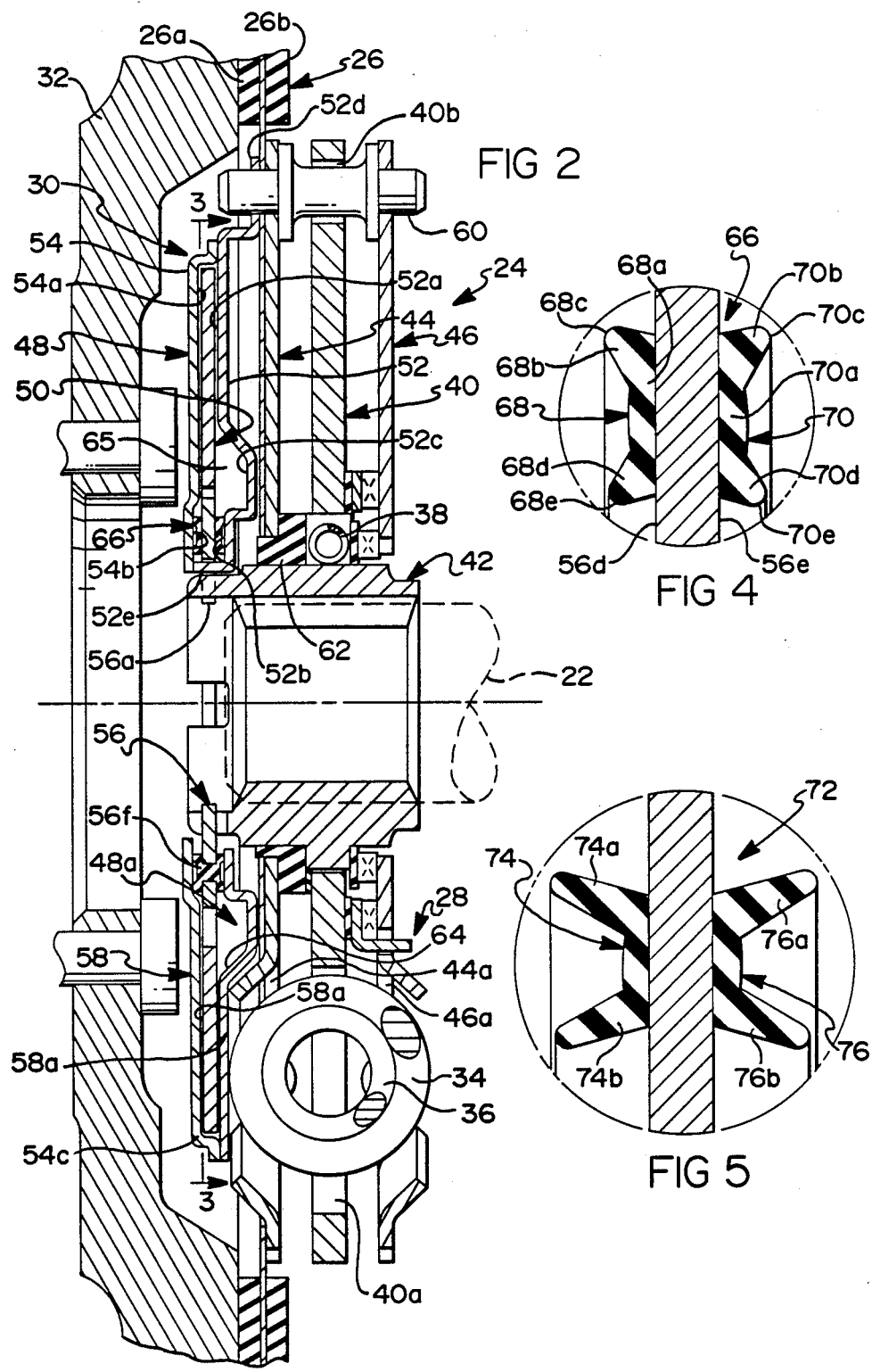

VISCOUS DAMPER WITH LOW SEAL DRAG TORQUE

CROSS-REFERENCE TO RELATED APPLICATIONS

The invention of this application relates to U.S. Pat. No. 4,782,932; to U.S. application Ser. No. 256,690, filed Oct. 12, 1988; and to U.S. application Ser. Nos. 256,816, and 257,258, filed Oct. 12, 1988. The above are assigned to the assignee of this application and are incorporated herein by reference.

FIELD OF THE INVENTION

This invention relates to torsional vibration damping mechanisms. More specifically, this invention relates to a viscous shear device which may be used for damping the rate of spring recoil in a torsion vibration damping mechanism.

BACKGROUND OF THE INVENTION

Torsional vibration damping mechanisms have long been used to reduce the adverse effects of torsional vibrations or fluctuating torques in vehicle drivelines. Such torsional vibrations or fluctuating torques, hereinafter referred to as torsionals, emanate primarily from engine power pulses and torque spikes, and from abrupt changes in driveline torque due primarily to rapid engine acceleration/deceleration and transmission ratio changes.

Most known, prior art torsional vibration damping mechanisms have employed springs disposed in parallel with a mechanical friction device. A well known and basic type of such mechanism has comprised plate like members mounted for limited relative rotation, a set of helical compression springs interconnecting the members and a mechanical friction device responsive to relative rotation of the members. Driveline torque is normally transmitted by the helical springs and flexing of the springs attenuates or reduces the potential amplitude of the driveline torsionals. The mechanical friction device dampens or reduces the rate of spring recoil. When the amplitude of the torsionals is less than the breakaway torque of the friction device, spring flexing does not occur and the torsionals are transmitted without benefit of attenuation.

It is also known to employ flat spiral wound or helical compression springs in parallel with a viscous coupling or damper mechanism, as may be seen by reference to U.S. Pat. Nos. 4,608,883 and 4,601,676, respectively, which are incorporated herein by reference. Since a liquid is the clutching medium within a viscous shear damper, the problem of breakaway torque associated with mechanical friction devices is in theory eliminated. However, such viscous shear dampers have been difficult to fit into the limited space available in vehicle drivelines and when reduced to sizes that fit in the limited space available, they have been difficult to assemble and properly fill with viscous shear oil, and they have required costly and/or bulky dynamic seals to eliminate seal drag torque. Further, when the housings of the viscous shear devices have been formed of relatively thin walled stampings to reduce the axial thickness and cost, manufacturing tolerances and axial flexing of the walls has caused large variation in seal drag torque.

SUMMARY OF THE INVENTION

An object of this invention is to provide means for reducing variations in dynamic seal drag in a viscous coupling or damper.

According to a feature of the invention, a viscous shear mechanism includes annular housing and clutch assemblies adapted for relative rotation about a common axis. The housing assembly includes first and second relatively thin, radially extending sidewalls having mutually facing sidewall surfaces defining an annular radially extending compartment closed by means sealing and securing the sidewalls against relative rotational and axial movement at the radially outer extent of the compartment. The clutch assembly includes radially inner and outer portions, the outer portion having oppositely facing radially extending surfaces disposed in close axially spaced relation from the sidewall surfaces for viscous clutching coaction therebetween via a viscous shear liquid in the compartment, and the inner portion extending radially inward of the housing. The radially inner extent of the compartment is closed by dynamic seal means cooperating between radially inner portions of the sidewalls and oppositely facing sides of the clutch assembly.

The improvement characterized by:

the radially inner portions of the sidewalls defining axially facing and axially spaced apart seal surfaces; and an annular spacer ring of predetermined axial length reacting between the sidewalls substantially adjacent to the dynamic seal means for fixing the axially spaced apart distance between the seal surfaces, the spacer being defined by a ring portion having at least two axially extending portions extending freely through clutch assembly openings allowing a predetermined amount of relative rotation between the clutch assembly and the spacer ring.

BRIEF DESCRIPTION OF THE DRAWINGS

The torsional damping mechanism of the present invention is shown in the accompanying drawings in which:

FIG. 1 is a schematic view of a motor vehicle driveline;

FIG. 2 is a detailed, sectional view of the mechanism looking along line 2—2 of FIG. 3;

FIG. 4 is an enlarged sectional view of a portion of a seal in the mechanism;

FIG. 5 is an enlarged sectional view of a portion of an alternative seal;

FIG. 6 is a sectional view of the viscous damper illustrating a method of assembling and filling the damper with a viscous shear liquid;

DETAILED DESCRIPTION OF THE DRAWINGS

Figure 3:
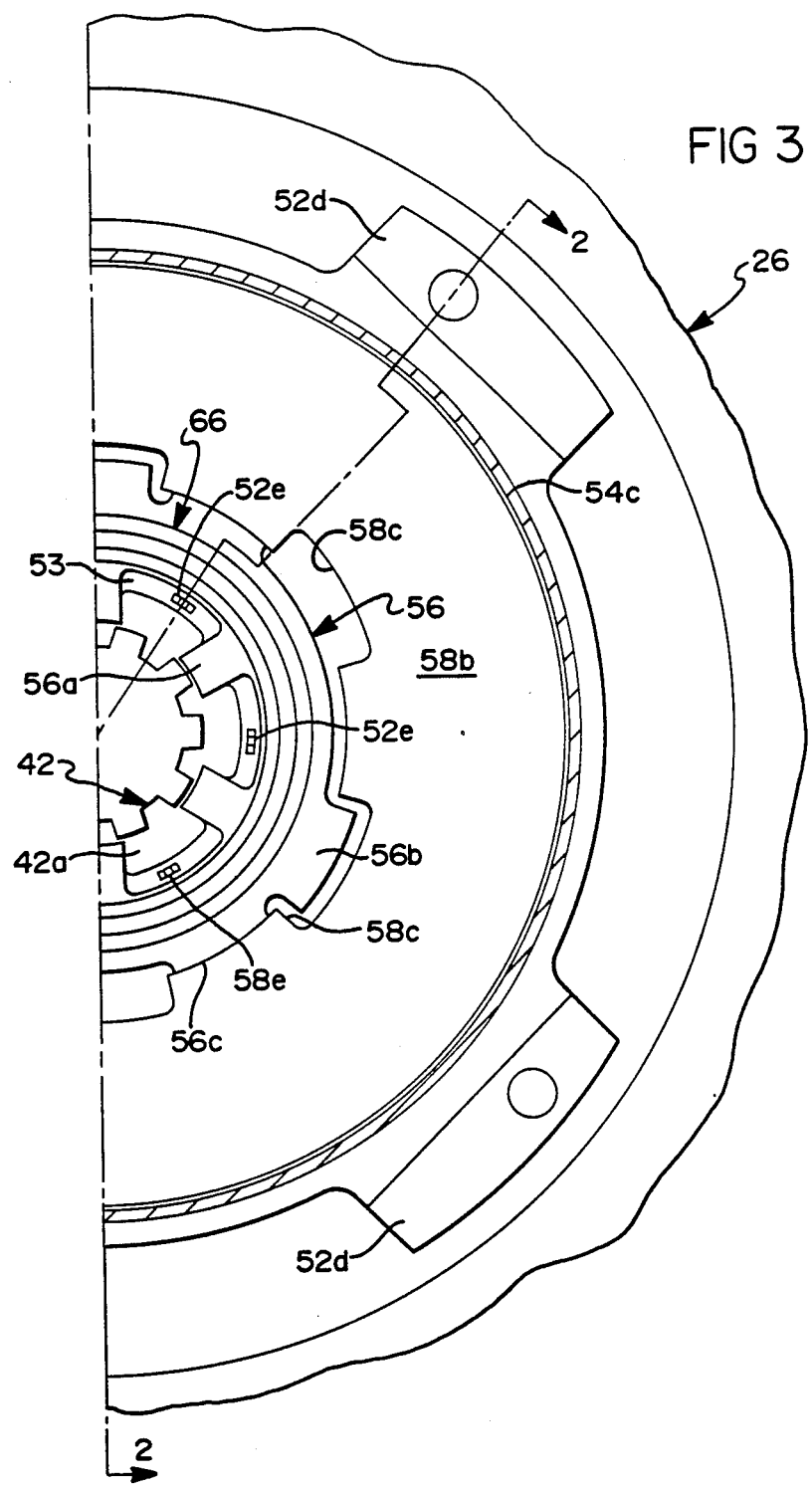
FIG. 3 is a detailed, sectional view of a viscous damper of the mechanism looking along line 3—3 of FIG. 2.

The motor vehicle driveline seen schematically in FIG. 1 includes a prime mover 10 and a transmission 12 having an output shaft 14 drivingly connected to a load such as a ground engaging wheel 16 via a differential gear assembly 18 for rear and/or front axles of a vehicle. Prime mover 10 is preferably of the internal, periodic combustion type but may be any type of power plant having torque characteristics that are improved by a torsional vibration damping mechanism. Transmission 12 includes a housing 20 containing a plurality of unshown, constant mesh ratio gears or ratio change mechanisms driven by a transmission input shaft or drive 22 partially shown in FIG. 2. Well-known ratio change devices or clutches within the transmission are employed to selectively (i.e., manually or automatically) put the transmission in a neutral position wherein the input shaft 22 is not connected to the load or in-gear positions wherein the input shaft is connected to the load.

Looking now at FIGS. 2 and 3, therein is illustrated an annular clutch plate assembly 24 disposed for rotation about the axis of transmission input shaft 22. Clutch plate assembly 24 includes a partially shown annular friction ring 26 in driving relation with shaft 22 via a spring damping mechanism 28 positioned radially between the friction ring and shaft 22 and disposed in parallel with a viscous shear damper mechanism 30. The friction ring includes oppositely facing friction surfaces 26a,26b frictionally connectable to a partially shown engine flywheel 32 in response to selective axial movement of an unshown pressure plate in well-known manner.

The spring damper mechanism 28, which is well-known in the prior art, includes a first set of pairs of springs 34,36 for transmitting full driveline torque, a set of gear anti-rattle springs 38, an intermediate member 40, a hub 42 slidably splined to drive 22, and a support structure including annular side plates 44,46. The viscous damper mechanism 30 or module includes annular housing and clutch assemblies 48,50. Housing assembly 48 includes first and second radially extending sidewalls 52,54 and clutch assembly 50 includes radially inner and outer members 56,58. The sidewalls define an annular radially extending compartment 48a closed at its radially outer extent, open at its radially inner extent and having the clutch assembly inner and outer members disposed therein. Side plates 44,46 of the support structure are rigidly secured together by a plurality of pins 60. As shown herein, the pins also rigidly secure friction ring 26 and viscous damper housing assembly 48 to the support structure. The ends of the pins are penned over when assembly is complete. Intermediate member 40 includes a plurality of circumferentially spaced apart openings 40a each receiving a pair of springs 34,36. The springs are also received by an equal number of pairs of circumferentially spaced apart openings 44a,46a in side plates 44,46. Radially extending ends of openings 40a,44a,46a react against the springs and connect the springs parallel with each other. Side plate 44 is journaled on hub 42 by a plastic bushing 62, intermediate member 40 is loosely splined to hub 42 in the circumferential direction. Anti-rattle springs 38 resist the free play between the unshown splines of member 40 and hub 42. Pins 60 pass through arcuate, circumferentially extending slots 40b in intermediate member 40 to allow friction ring 26, side plates 44,46 and viscous damper housing assembly 48 to rotate as a unit relative to intermediate member 40 and hub 42 in response to flexing of the springs 34,36,38.

The viscous damper inner clutch member 56 includes splines 56a which mate with splines 42a of the hub, whereby a given relative rotation between friction ring 26 and hub 42 provides an equal relative rotation between viscous damper housing assembly 48 and inner clutch member 56. Housing assembly 48 and clutch assembly 50 define closely spaced apart shear surfaces which are in clutching coaction via viscous shear liquid therebetween. The viscous shear liquid is of high viscosity and is preferably a silicone oil, for example dimethyl polysiloxane. The actual viscosity depends on driveline application, area and spacing of the housing and clutch surfaces, mean radius of the surface areas, etc.

Looking now at viscous damper mechanism 30 in greater detail, annular housing and clutch assemblies 48,50 are formed of relatively thin stampings and therefore are relatively inexpensive to manufacture since they require little or no machining. Further, damping mechanism 30 is designed to facilitate installation in a limited available space, rapid and accurate assembly in production, and rapid and accurate filling with viscous shear liquid during assembly. Many different stamping materials may be used, e.g., steel or aluminum or a combination of both.

With respect to housing assembly 48, first sidewall 52 includes a radially outer portion defining a flat, annular shear surface 52a, a radially inner portion defining a flat, annular seal surface 52b, an annular bulge 52c, and a plurality of tabs or feet 52d secured to pins 60 as previously mentioned. Sidewall 54 includes a radially outer portion defining a flat, annular shear surface 54a, a radially inner portion defining a flat, annular seal surface 54b, and an annular axially extending outer flange 54c sealingly secured to a radially outer extent of shear surface 52a and having an axial length defining the axial distance between shear surfaces 52a,54a.

With respect of clutch assembly 50, outer clutch member 58 includes axially oppositely facing, flat, annular shear surfaces 58a,58b which are closely spaced from the sidewall shear surfaces 52a,54a to form a viscous shear chamber 64, generally bounded in the radial direction by outer flange 54c and the radially outer periphery of annular bulge 52c. The remainder of compartment 48a defines a reservoir chamber 65. The inner periphery of outer member 58 is drivingly connected to the outer periphery of inner member 56 via tabs 56b which are received by half of recesses 58c. Herein, the arcuate length of recesses 58c is greater than that of tabs 56b to allow rotational free play or lost motion therebetween. Alternatively, the free play may be deleted while maintaining the two member configuration clutch assembly 50 or by forming the clutch assembly of a single member. Inner clutch member 56 includes, in addition to splines or tabs 56a,56b, a plurality of arcuate surfaces 56c of equal radius journaling the outer member thereon and a dynamic face seal assembly 66 integral with the inner member. The seal assembly is partially shown enlarged in FIG. 4.

The seal assembly includes symmetrical face seals 68,70 each having a base portion 68a,70a sealingly affixed to axially oppositely facing surfaces 56d,56e of the inner clutch member, an axially and radially inwardly extending primary seal portion 68b,70b terminating in a lip 68c,70c in dynamic sealing contact with sidewall seal surface 52b,54b, and an axially and radially inwardly extending exclusion seal portion 68d,70d terminating in a lip 68e,70e also in dynamic sealing contact with seal surface 52b,54b. The bases of seals 68,70 are preferably, but not necessarily, joined by extrusion of the elastomeric material through a plurality of openings 56f in the clutch inner member during the molding process. Primary seal portions 68b,70b prevent egress or leakage of fluid from housing compartment 48a of the damper mechanism. Exclusion seal portions 68d,70d prevent ingress of abrasive contaminants to the lips of the primary seals when the damper is used in relatively dry environments or of pressurized fluid when the damper is used in, for example, a torque converter housing. When the exclusion seals are unlubricated, their axial length is preferably less than that of the primary seals, to reduce seal drag torque and wear.

Figure 7:
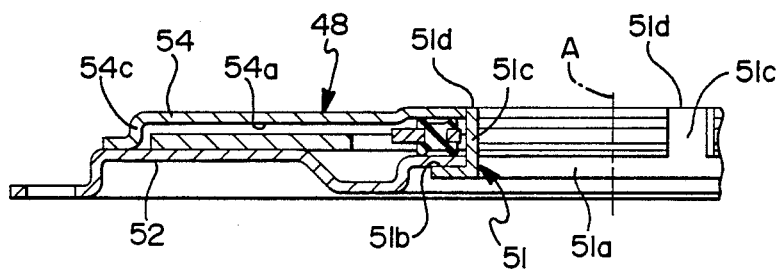
FIG. 7 is a sectional view of a portion of the viscous damper of FIG. 2.

Further with respect to dynamic sealing of viscous damper and particularly a damper housing having relatively thin sidewalls, such as sidewalls 52,54, it has been found that the sidewalls separate axially due to centrifugal effects, thereby increasing the need for greater minimum amounts of initial or static seal compression to ensure sealing as the housing separates due to centrifugal effects. Such a minimum seal compression increases seal drag torque at low rotational speeds and, in combination with seal compression added by manufacturing tolerance can result in excessively high seal drag torque, reduced seal life, and poor performance of the spring and viscous damper. Axial separation of the housing sidewalls is prevented and manufacturing tolerances are reduced, particularly in the area of seal surfaces 52b,54b, by structurally connecting the radially inner extent of the sidewalls together by a spacer ring 51 of predetermined axial length. Spacer ring 51, as seen in FIGS. 2 and 7 includes a radially extending ring position 51a defining a radially extending surface 51b abutting an outer wall surface of sidewall 52 and a plurality (herein 3) of axially extending tabs or fingers 51c having distal ends 51d affixed to sidewall 54 by known method, e.g., laser welding. Since the thickness tolerance of the sidewalls is rather small, the axial length of spacer ring 51 may be used to establish a predetermined axial spacing between seal surfaces 52b,54b. Herein, the axial length is the distance between surface 51b and ends 51d. When spacer ring 51 is used to establish or control the axial spacing between the seal surfaces, one or both of housing sidewall 52,54 are preferably formed such that free spacing between the seal surfaces is slightly greater than the preferred axial spacing, thereby facilitating the use of a clamping force on the sidewall when installing spacer ring 51. The fingers extend freely through circumferentially extending openings 53 between splines 42a,56a of hub 42 and inner clutch member 56.

FIG. 5 illustrates an enlarged cross-section of a portion of an alternative molded seal assembly 72 including face seals 74,76 each having extended primary and exclusion seal portions 74a,74b, and 76a,76b to further reduce seal drag torque. When seal assembly 72 is used, the sidewall seal surfaces 52b,54b are spaced further apart. Molded seal assemblies 66 and 72 simplify assembly of the damper mechanism since they are integral with the clutch assembly and therefore are installed and properly positioned in one operational step with the clutch assembly. The molded seal assemblies are also axially compact while still being very flexible in the axial direction; hence, they reduce the axial space necessary to provide reliable sealing while at the same time reducing the effects of manufacturing tolerances which substantially vary seal compression and may dramatically increase seal drag torque. Further, the feature of an exclusion seal also protects the primary seal from early or premature failure due to abrasive contaminants.

Looking now at FIG. 6, therein is illustrated a method of assembling and rapidly filling damper mechanism 30 with a predetermined volume of silicone oil sufficient to ensure that thermal expansion of the oil does not over fill compartment 48a when the compartment volume is a minimum due to manufacturing tolerances and the oil volume is a maximum due to measuring tolerances, and to ensure a full fill of the shear chamber 64 when the shear volume is a maximum due to manufacturing tolerances and the oil volume is a minimum due to measuring tolerances.

Assembling and filling include positioning sidewall 52 of housing 48 on a support 78 with shear and seal surfaces 52a,52b facing upward and in a horizontal plane. Clutch assembly 50 is then positioned over sidewall 52 with seal 70 of seal assembly 66 resting on seal surface 52b and outer member shear surface 58a resting on or spaced a small distance above sidewall shear surface 52a, thereby defining a substantially trapped volume accessible via openings 58c between the inner and outer clutch members. This trapped volume, by design, has a capacity sufficient to receive the above mentioned predetermined volume of silicone oil for all tolerance conditions mentioned above without overflowing the upper surfaces 56d,58b of inner and outer members 56,58. The silicone is readily injected into the trapped volume through openings 58c which are not receiving one of the splines or tabs 56b of the inner member. Sidewall 54 is then positioned with spacer flange 54c seated on a radially outer extent of shear surface 52a. The interface of the spacer flange and shear surface are then sealingly secured together by known methods. Since the silicone oil, contained in the trapped volume, is spaced a substantial distance from spacer flange 54c, any of several rapid welding methods may be used, e.g., resistance or laser welding.

Figure 8:
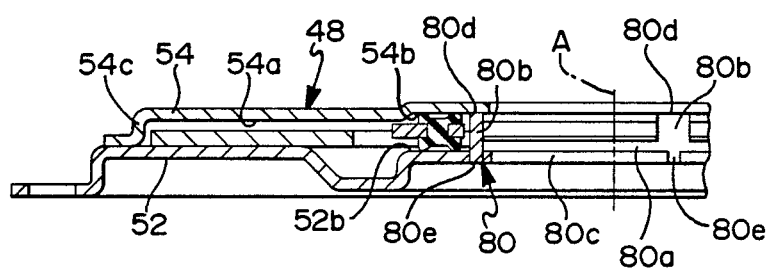
FIGS. 8 and 9 illustrate alternative embodiments of a spacer ring shown in FIGS. 2 and 7.

FIG. 8 illustrates a second spacer ring embodiment 80 for establishing the axial spacing between seal surfaces 52b,54b. Spacer ring 80 includes a ring portion 80a and a plurality of axially extending tabs or fingers 80b. The axial length of spacer ring 80 is defined by an axially facing end 80c of ring portion 80a and the distal ends 80d of fingers 80b. Ends 80c,80d react against or abut radially inward extensions of seal surfaces 52b,54b. The extensions of one of the seal surfaces (e.g., 52b) may be provided with one or more recesses or openings 52e which receive projections 80e from ring portion 80a for ensuring positioning of the ring concentric to the axis of the damper.

Figure 9:
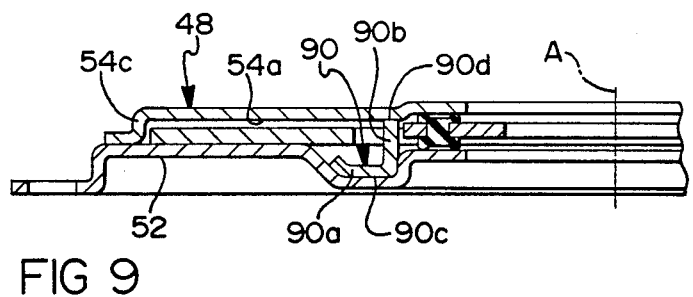

FIG. 9 illustrates a third spacer ring embodiment 90 for establishing the axial spacing between seal surfaces 52b,54b. Spacer ring 90 includes a ring portion 90a and a plurality of axially extending tabs or fingers 90b. Fingers 90b, in a manner analogous to fingers 51c and 80b, extend freely through openings defined by the recesses 58c which do not receive tabs 56. The ring portion is disposed within the annular bulge defining reservoir 65. The axial length of spacer ring 90 is defined by an axially facing end 90c of ring portion 90a and the distal ends 90d of fingers 90b. End 90c reacts against or abuts an end surface of the annular bulge and end 90d reacts against or abutt a radially inner portion of sidewall surface 54a adjacent to and radially outward of seal means 66. The spacer ring is positioned concentric to axis A by the curved wall surfaces of the reservoir. When spacer rings 80 or 90 are used to establish or control the axial spacing between seal surfaces 52b,54b, one or both of the housing sidewalls 52,54 are preferably formed such that the free spacing between the seal surfaces is slightly less than the preferred axial spacing, whereby the sidewalls are preloaded against the ends of the spacer rings when the sidewalls are brought together during assembly.

Three embodiments of the invention have been disclosed for illustrative purposes. Many variations and modifications of the disclosed embodiments are believed to be within the spirit of the invention. The following claims are intended to cover the inventive portions of the disclosed embodiments and variations and modifications within the spirit of the invention.

What is claimed is:

1. A viscous shear mechanism including annular housing and clutch assemblies adapted for relative rotation about a common axis; the housing assembly including first and second relatively thin, radially extending sidewalls having mutually facing sidewall surfaces defining an annular radially extending compartment closed by means sealing and securing the sidewalls against relative rotational and axial movement at the radially outer extent of the compartment; the clutch assembly including radially inner and outer portions, the outer portion having oppositely facing radially extending surfaces disposed in close axially spaced relation from the sidewall surfaces for viscous clutching coaction therebetween via a viscous shear liquid in the compartment, the inner portion extending radially inward of the housing; the radially inner extent of the compartment closed by dynamic seal means cooperating between radially inner portions of the sidewalls and oppositely facing sides of the clutch assembly characterized by:

the radially inner portions of the sidewalls defining axially facing and axially spaced apart seal surfaces cooperating with the seal means; and a spacer ring of predetermined axial length cooperating with the sidewalls at positions substantially adjacent to the dynamic seal means for establishing a predetermined axial spacing between the seal surfaces, the spacer ring including a ring portion having at least two finger portions extending axially therefrom and freely through clutch assembly openings allowing relative rotation between the clutch assembly and the spacer ring.

2. The mechanism of claim 1, wherein the spacer ring predetermined axial length is defined by first and second ends facing axially in opposite directions and respectively defined by an end face of the ring portion and distal ends of the finger portions, the first and second ends respectively disposed in preload and abutting relation with mutually facing surface portions of the first and second sidewalls.

3. The mechanism of claim 2, wherein the ends abut radially extending portions of the seal surfaces.

4. The mechanism of claim 3, wherein the spacer ring is disposed radially inward of the seal means.

5. The mechanism of claim 4, wherein at least one of the radially extending portions of the seal surfaces includes recess means receiving means projecting axially from the spacer ring end.

6. The mechanism of claim 2, wherein the first sidewall includes annular bulge disposed radially outward and substantially adjacent the first sidewall seal surface, and the ring portion being disposed within the bulge.

7. The mechanism of claim 1, wherein the spacer ring is disposed radially inward of the radially inner extent of the sidewalls; the ring portion having a radially extending surface abutting an outer wall surface of one of the sidewalls and distal ends of the finger portions affixed to the other sidewall.

8. The mechanism of claim 7, wherein the distal ends are welded to the other sidewall.

* * * * *